(12) United States Patent  
Umemura

(10) Patent No.: US 7,430,183 B2  
(45) Date of Patent: Sep. 30, 2008

(54) COMMUNICATION SYSTEM FOR CONNECTING A COMMUNICATION APPARATUS TO A SPECIFIC CONNECTING APPARATUS

(75) Inventor: Naoki Umemura, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 612 days.

(21) Appl. No.: 11/134,267

(22) Filed: May 23, 2005

(65) Prior Publication Data

US 2005/0265286 A1 Dec. 1, 2005

(30) Foreign Application Priority Data

May 31, 2004 (JP) .............................. 2004-162456

(51) Int. Cl.
*H04Q 7/20* (2006.01)
(52) U.S. Cl. .................... 370/310.2; 370/328; 370/331; 370/338
(58) Field of Classification Search ................. 370/310, 370/310.2, 328, 329, 331, 332, 338, 346; 455/426.1, 426, 422.1, 554.1, 554.2, 555, 455/412.1, 2, 421, 436, 445, 567
See application file for complete search history.

(56) References Cited

U.S. PATENT DOCUMENTS 7,035,242 B2 * 4/2006 Shaheen et al. ............. 370/338

| | | | |
|---|---|---|---|
| 2002/0041689 A1 | 4/2002 | Morimoto | 380/270 |
| 2003/0117985 A1* | 6/2003 | Fujii et al. | 370/338 |
| 2004/0013640 A1* | 1/2004 | Zardi et al. | 424/85.1 |
| 2004/0132427 A1* | 7/2004 | Lee et al. | 455/406 |
| 2004/0139320 A1* | 7/2004 | Shinohara | 713/168 |
| 2004/0259546 A1* | 12/2004 | Balachandran et al. | 455/435.2 |
| 2005/0018686 A1 | 1/2005 | Igarashi et al. | 370/395.2 |
| 2005/0170852 A1* | 8/2005 | Li et al. | 455/456.5 |
| 2006/0194568 A1* | 8/2006 | Sharony | 455/410 |
| 2006/0264201 A1* | 11/2006 | Zhang | 455/411 |

FOREIGN PATENT DOCUMENTS

| | | |
|---|---|---|
| JP | 10-178429 | 6/1998 |
| JP | 2003-101546 | 4/2003 |
| JP | 2003-143161 | 5/2003 |

* cited by examiner

*Primary Examiner*—Jean A Gelin
(74) *Attorney, Agent, or Firm*—Fitzpatrick, Cella, Harper & Scinto

(57) ABSTRACT

A wireless communication device can be wirelessly connected uniquely to a specific single wireless communication access point among a plurality of these access points in a roaming environment. Wireless LAN terminals input a connection ID for identifying a specific access point among access points and transmit the entered connection ID to one access point that has been wirelessly connected. If a frequency channel for making a connection to a specific access point corresponding to the connection ID is designated by a notification, from the wirelessly connected one access point, indicating whether the connection ID is appropriate or not, then the wireless LAN terminals set this frequency channel and establish a wireless connection to the specific access point.

18 Claims, 12 Drawing Sheets

FIG. 2

|  | ESS-ID | FREQUENCY CHANNEL |
|---|---|---|
| AP 104 | abcdefg | 1ch |
| AP 105 | abcdefg | 6ch |
| AP 106 | abcdefg | 1ch |
| AP 107 | abcdefg | 11ch |
| AP 108 | abcdefg | 14ch |
| AP 109 | abcdefg | 11ch |
| TERMINAL 110 | abcdefg | 1ch |
| TERMINAL 111 | abcdefg | 6ch |
| TERMINAL 112 | abcdefg | 11ch |

US 7,430,183 B2

COMMUNICATION SYSTEM FOR CONNECTING A COMMUNICATION APPARATUS TO A SPECIFIC CONNECTING APPARATUS

FIELD OF THE INVENTION

This invention relates to a communication system for connecting a communication apparatus to a specific connecting apparatus, to the communication apparatus and connecting apparatus used in this system, to communication methods implemented by the communication apparatus and connecting apparatus, and to programs for controlling the communication apparatus and connecting apparatus.

BACKGROUND OF THE INVENTION

In a wireless communication method using a wireless LAN (Local Area Network) compliant with the IEEE 802.11 standard, a wireless LAN terminal that performs wireless communication in the infrastructure mode implements such wireless communication upon being connected to a specific wireless communication access point (referred to as an "AP" below). In order to achieve this, it is necessary to set an identification code (ESS-ID: Extended Service Set Identification) that has been set in the specific AP. In a case where identification codes set in a plurality of APs in an infrastructure network are all made the same, the wireless LAN terminal sets an identification code that is the same as that of the APs, thereby enabling the terminal to be connected without changing the setting of the identification code with respect to any AP. Such a method of connection is referred to as "roaming".

Thus, the present state of the art is such that if a wireless LAN terminal is connected to a specific AP, it is necessary that the same identification code be set in the AP and wireless LAN terminal. However, in a roaming environment in which the same identification code has been set for a plurality of APs, an identification code identical with identification information that has been set commonly in a plurality of APs is set in the wireless LAN terminal. As a consequence, the wireless LAN terminal cannot be connected to a specific AP among a plurality of APs.

SUMMARY OF THE INVENTION

Accordingly, an object of the present invention is to make it possible for a communication apparatus to be wirelessly connected uniquely to a specific connecting apparatus among a plurality thereof.

Another object of the present invention is to so arrange it that a communication apparatus can be simply connected to a specific connecting apparatus in a roaming environment.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 2 is a diagram illustrating an example of ESS-IDs (identification codes for wireless communication) and frequency channels that have been set in advance in respective ones of APs 104 to 109 and wireless LAN terminals 110 to 112 in this embodiment of the present invention;

DETAILED DESCRIPTION OF THE PREFERRED EMBODIMENT

A preferred embodiment of the present invention will now be described with reference to the drawings.

Figure 1:
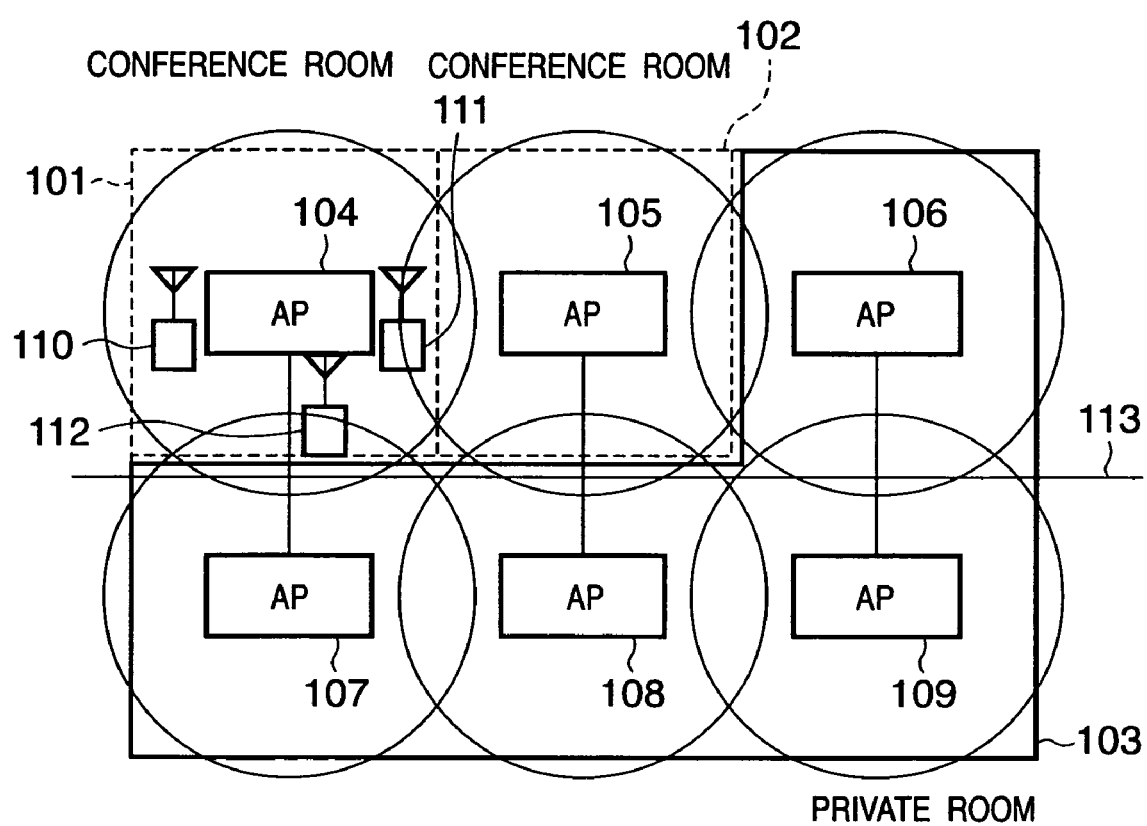
FIG. 1 is a schematic view illustrating an example of deployment of wireless access points in a company in which a wireless communications system according to an embodiment of the present invention has been introduced.

FIG. 1 is a schematic view illustrating an example of deployment of wireless access points (APs) in a company in which a wireless communications system according to an embodiment of the present invention has been introduced. FIG. 2 is a diagram illustrating an example of ESS-IDs (Extended Service Set Identifications) and frequency channels that have been set in advance in respective ones of APs 104 to 109 and wireless LAN terminals 110 to 112 in FIG. 1.

In a company in which a LAN has been constructed, a wireless LAN is introduced and wireless communication access points (APs) 104 to 109 for constructing the wireless LAN are deployed in conference rooms 101, 102 and in a private room 103. Here the wireless LAN that has been introduced is compliant with IEEE 802.11b. The wireless LAN may be one compliant with a wireless LAN standard other than IEEE 802.11b, such as IEEE 802.11a or IEEE 802.11g. The APs 104 to 109 are physically connected to a backbone LAN 113 and are capable of being wirelessly connected to each of wireless LAN terminals (wireless communication devices) 110 to 112. The coverage area of each AP is represented by a circle drawn with the AP at its center. A wireless LAN terminal situated at a location where the coverage areas of APs overlap is capable of receiving radio waves from each of the APs whose coverage areas overlap.

As illustrated in FIG. 2, the same ESS-ID (e.g., abcdefg) has been set in each of the APs 104 to 109 and wireless LAN terminals 110 to 112 in order to implement roaming. Further, the APs 104 to 109 have been set to frequency channels beforehand in such a manner that the frequency bands of neighboring APs will not overlap. For example, if wireless LAN terminals 110 to 112 are located in conference room 101, as illustrated in FIG. 1, each of the wireless LAN terminals 110 to 112 will be in a state in which its frequency channel has been set to the frequency channel of the AP connected at the moment the terminal enters the conference room 101. In this example, the wireless LAN terminal 110 is wirelessly connected to AP 104 and the frequency channel of wireless LAN terminal 110 has been set to the frequency channel of AP 104, namely "1ch". Similarly, the wireless LAN terminals 111 and 112 are wirelessly connected to APs 105 and 107, respectively, and the frequency channels of the wireless LAN terminals 111 and 112 have been set to the frequency channels "6ch" and "11ch" of APs 105 and 107, respectively.

Figure 3:
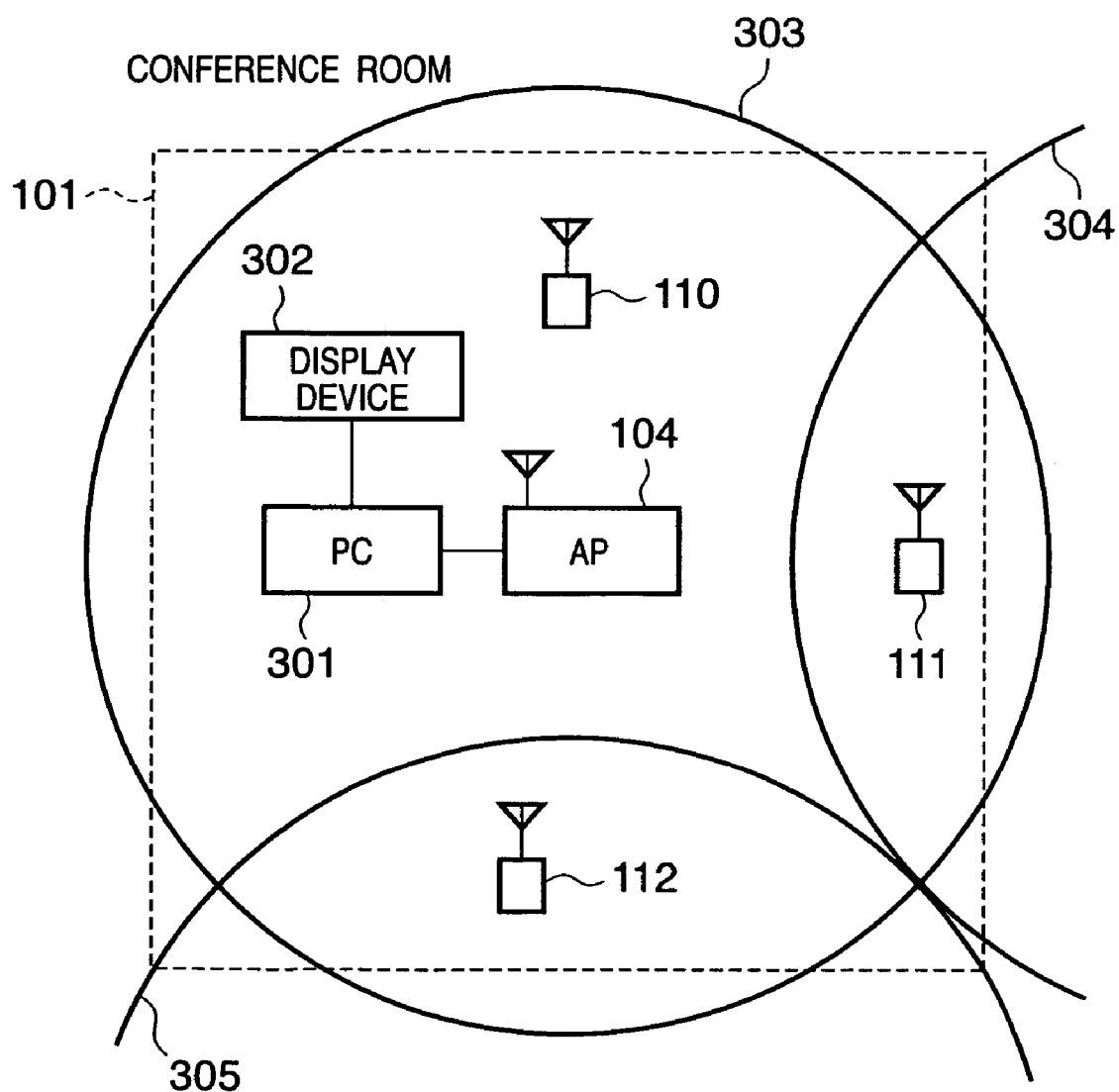
FIG. 3 is a diagram schematically illustrating the relationship between a coverage area of AP 104 and the positions of wireless LAN terminals 110 to 112 in a conference room according to an embodiment of the present invention.

Reference will now be had to FIG. 3 to describe the relationship between the coverage area of the AP 104 in conference room 101 and the positions of the wireless LAN terminals 110 to 112. FIG. 3 is a diagram schematically illustrating the relationship between the coverage area of AP 104 and the positions of the wireless LAN terminals 110 to 112 in the conference room 101 of FIG. 1.

A personal computer (PC) 301 is connected via the infrastructure network 113 to AP 104 situated in conference room 101. A display device 302 is physically connected to the personal computer 301. Furthermore, the personal computer 301 is also connected to the AP 105 via the infrastructure network 113.

The coverage area of AP 104 is the area indicated by circle 303 in FIG. 3. Part of this coverage area overlaps part of coverage area 304 of AP 105 deployed in conference room 102. Another part of this coverage area overlaps part of coverage area 305 of AP 107 deployed in private room 103. The wireless LAN terminal 110 is present at a location where it can receive radio waves only from AP 104. The wireless LAN terminal 111 is present at a location where it can receive radio waves from two APs, namely APs 104 and 105, and the wireless LAN terminal 112 is present at a location where it can receive radio waves from two APs, namely APs 104 and 107.

The same ESS-ID has been set in the APs 204 to 109 and wireless LAN terminals 110 to 112, as illustrated in FIG. 2. If the wireless LAN terminals 110 to 112 enter the coverage area of any of the APs 104 to 109, therefore, they can be connected to any of these APs 104 to 109 having these coverage areas. Further, in a case where the wireless LAN terminals 110 to 112 have moved with their power supplies ON, the fact that the AP at the destination has been set to the same ESS-ID means that the terminal can be connected to this AP.

This embodiment provides a function whereby the wireless LAN terminals 110 to 112, if they are present at a location where the coverage areas of at least two APs overlap, select a specific AP from at least two APs and can be connected to this AP. Accordingly, in this embodiment, it is assumed that application software for implementing this function has been installed in each of the wireless LAN terminals 110 to 112 and APs 104, 105, and that this application software has not been installed in the APs 106, 107, 108 and 109 situated in the private room 103.

By virtue of the above-mentioned application software, the APs 104, 105 in which this application software has been installed receive the connection IDs used by the other APs from these other APs before they generate their own connection IDs, and generate the connection IDs in such a manner that the generated connection IDs will not be the same as connection IDs used by the other APs. Furthermore, the generated connection IDs can be transmitted to the other APs. As such time the APs 104, 105 send and receive, together with the connection IDs, the frequency channels to which they have been set and information such as the AP name. As a result, the APs situated in the conference rooms are capable of ascertaining each other's connection IDs and set frequency channels, etc.

The function mentioned above will now be described with reference to FIG. 4, which is a block diagram illustrating a communication procedure that employs application software for receiving a connection ID after establishment of a wireless communication connection, this procedure being implemented by the wireless LAN terminals 110 to 112 and APs 104, 105.

Figure 4:
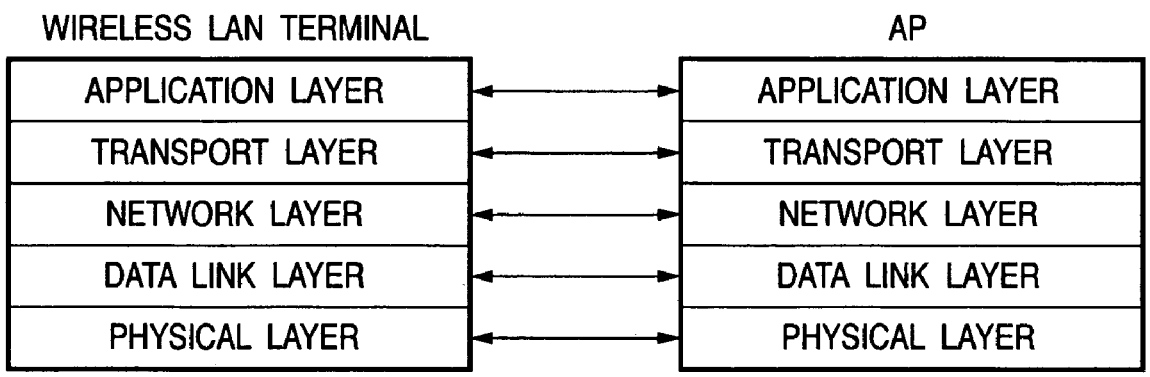
FIG. 4 is a block diagram illustrating a communication procedure that employs application software for receiving a connection ID after establishment of a wireless communication connection, this procedure being implemented by wireless LAN terminals 110 to 112 and APs 104, 105 in an embodiment of the present invention.

As shown in FIG. 4, the wireless LAN terminals 110 to 112 and APs 104, 105 set the same ESS-ID in their physical layers and data link layers using wireless LAN hardware and establish a wireless communication network. An Internet Protocol (IP) connection is thenceforth established by the network layers and transport layers of the wireless LAN terminals 110 to 112 and APs 104 to 109. The application software for wireless connection previously installed is then started up in the wireless LAN terminals 110 to 112 and APs 104, 105, IP communication is performed based upon TCP/IP, and information is exchanged among these terminals and APs.

The wireless-connection application software installed in the wireless LAN terminals 110 to 112 is capable of setting a wireless connection unit (i.e., is capable of setting the ESS-ID and frequency channel, etc.) via an API (Application Program Interface) of a wireless communication driver for the purpose of setting the wireless communication hardware mounted in the wireless LAN terminals 110 to 112.

Figure 5:
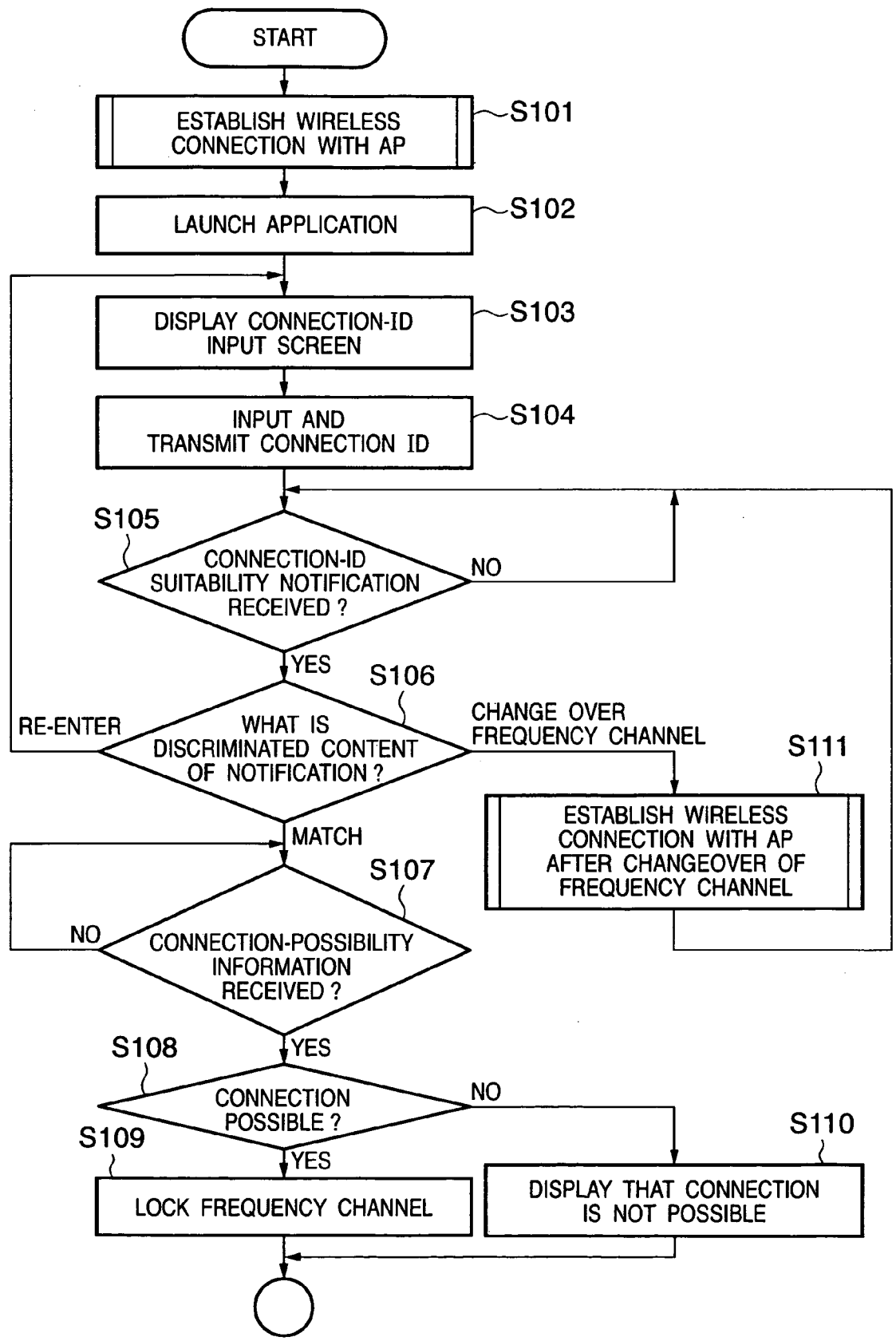
FIG. 5 is a flowchart illustrating the procedure of a communication operation based upon application software for a wireless connection in wireless LAN terminals 110 to 112 in an embodiment of the present invention.

Reference will now be had to FIG. 5 to describe the communication operation based upon the application software in the wireless LAN terminals 110 to 112. FIG. 5 is a flowchart illustrating the procedure of the communication operation based upon the wireless-connection application software in wireless LAN terminals 110 to 112.

When the wireless LAN terminals 110 to 112 are started up by turning on their power supplies, the wireless LAN terminals 110 to 112 attempt to establish a wireless communication network with a corresponding AP using the ESS-ID set in advance, and wireless connection is established with the corresponding AP (step S101). More specifically, if wireless LAN terminal 110 has been started up, the terminal sets the ESS-ID (abcdefg) that has been set in the wireless LAN terminal 110 beforehand and searches for a frequency channel, whereby the beacon of AP 104 is received on frequency channel 1ch. If the beacon can be received, the terminal sets the frequency channel for which the beacon could be received and issues a connection request to the AP 104. If establishment of a wireless communication network with the AP fails and the terminal cannot be wirelessly connected to the AP, then the frequency channel is changed over to another frequency channel and establishment of a wireless communication network with the AP is attempted at suitable intervals.

Next, the application software for wireless connection is launched (step S102) and a connection-ID input screen for inputting a connection ID corresponding to a specific AP is displayed on the display device of the wireless LAN terminals 110 to 112 (step 102). Here the connection ID is identification information that is capable of uniquely identifying a specific AP and is generated in each AP as a connection ID specific to that AP. If connection IDs are input on the connection-ID input screens by the users of the wireless LAN terminals 110 to 112, the entered connection IDs are transmitted to the AP wirelessly connected to the wireless LAN terminals 110 to 112 (step 104).

Next, the wireless LAN terminals 110 to 112 transition to a state in which they wait for receipt of notification, which is transmitted from the wirelessly connected AP, as to whether the connection ID is appropriate or not (step S105). Upon receiving such notification transmitted from the AP that is currently wirelessly connected, the wireless LAN terminals 110 to 112 discriminate the content of this notification (step S106). If the received notification as to whether the connection ID is appropriate or not prompts re-entry of the connection ID, then control returns to step S103, where the wireless LAN terminals 110 to 112 prompt the users to enter the connection ID again.

If the received notification as to whether the connection ID is appropriate or not gives notification of information concerning the frequency channel of another AP (a specific AP corresponding to the connection ID), then, in order to be connected to the other AP, the wireless LAN terminals 110 to 112 change over the frequency channel to the frequency channel reported from the AP and establish a wireless connection to this other AP (step S111). At such time the connection ID (the connection ID entered at step S104) is transmitted to this other AP. The wireless LAN terminals 110 to 112 then transition to a state in which they wait for receipt of information from this other AP as to whether the connection ID is appropriate or not (step S105).

If the received notification reports that the connection ID matches, then the wireless LAN terminals 110 to 112 transition to a state in which they wait for receipt of information from the personal computer 301 as to whether connection is possible or not (step S107). If the information from the personal computer 301 as to whether connection is possible or not is received via the AP that is presently wirelessly connected, it is determined whether the received information indicates that connection is possible (step S108). If the received information indicates that connection is possible, then the frequency channel is locked at the present frequency channel so that an AP other than the AP that is presently wirelessly connected will not be switched to by roaming (step S109). On the other hand, if the received information indicates that connection is not possible, then the wireless LAN terminals 110 to 112 display information, which indicates that it is not possible to establish a connection to the AP 104 that is presently wirelessly connected, on the display devices of the wireless LAN terminals 110 to 112 (step S110). The connection between the wireless LAN terminals 110 to 112 and the AP that is presently wirelessly connected is then severed.

Though the related processing is not illustrated, if notification as to whether the connection ID is appropriate or not is not received upon elapse of a prescribed period of time from transmission of the connection ID (for example, if the above-mentioned wireless-connection application has not been installed in the AP at the transmission destination of the connection ID and this AP makes no response to the connection ID), the wireless LAN terminals 110 to 112 sever the connection to the AP to which they are presently wirelessly connected, the frequency channel is changed over to the frequency channel of another roaming-capable AP and a wireless connection is established with this other AP (step S111). At such time the connection ID (the connection ID entered at step S104) is transmitted to the AP after the changeover. The wireless LAN terminals 110 to 112 then transition to a state in which they wait for receipt of notification from the AP after the changeover as to whether the connection ID is appropriate or not (step S105).

Figure 6:
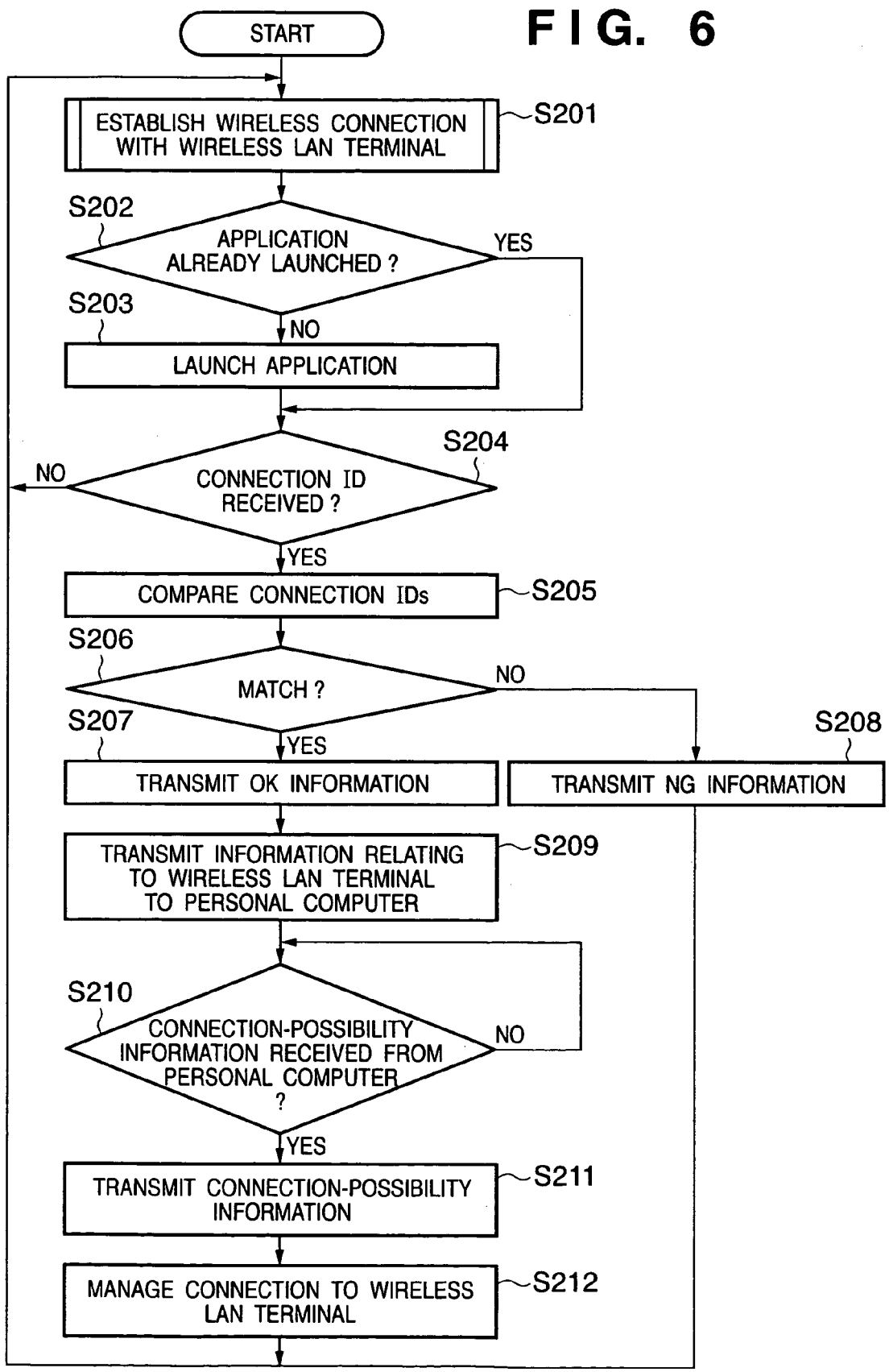
FIG. 6 is a flowchart illustrating the procedure of a communication operation based upon application software for a wireless connection in APs 104, 105 in an embodiment of the present invention.

Next, reference will be had to FIG. 6 to describe the communication operation based upon the application software in the APs 104, 105. FIG. 6 is a flowchart illustrating the procedure of a communication operation based upon the application software for a wireless connection in APs 104, 105.

When the APs 104, 105 are started up by turning on their power supplies and connection requests are received from the wireless LAN terminals 110 to 112, the APs respond to the connection requests by establishing a wireless communication network with the wireless LAN terminals 110 to 112 (step S201), as shown in FIG. 6. After the wireless communication network is established, an IP network based upon TCP/IP is established between the wireless LAN terminals 110 to 112 and APs 104, 105 and it becomes possible to send and receive data of the kind shown in FIG. 4 based upon the application software running based upon TCP/IP.

After the IP network is established with the wireless LAN terminals 110 to 112, it is determined whether the wireless-connection application software has already been launched (step S202). If the wireless-connection application software has not been launched, then this software is launched (step S203). A connection ID for use in the wireless connection is generated randomly by the wireless-connection application software. Accordingly, if the AP 104, for example, receives a connection ID used by the AP 105 via the infrastructure network 113 and the connection ID generated by the AP 104 itself is the same as the connection ID being generated by the AP 105, then the AP 104 generates a different connection ID anew in such a manner that it will not duplicate the connection ID being used by the AP 105. Further, a connection ID is similarly generated at the AP 105 as well. The connection IDs thus generated are transmitted from the APs 104, 105 to the personal computer 301 via the infrastructure network 113. The APs 104, 105 determine whether connection IDs transmitted from the wireless LAN terminals 110 to 112 have been received. If a connection ID is not received, control proceeds to step S201.

If connection IDs have been received (step S204), then the APs 104, 105 compare the received connection IDs with connection IDs (connection IDs generated by the APs themselves and connection IDs acquired from other APs) being held in memories of the APs 104, 105 (step S205). Based upon the results of the comparison performed at step S205, the APs 104, 105 determine whether the received connection IDs match the connection IDs generated by the APs themselves (step S206). If the two compared connection IDs do not match, two cases are conceivable as reasons, the first case being one where the wrong connection ID was entered by the wireless LAN terminals 110 to 112, and the second case being one where the received connection ID differs from the connection ID generated by the AP itself but matches the connection ID used by another AP. In the former case, the connection ID is different and therefore notification (NG information), which indicates that the connection ID is inappropriate and which prompts the user to re-enter the connection ID, is transmitted to the wireless LAN terminals 110 to 112 (step S208). In the latter case, notification (NG information) to the effect that the connection ID is inappropriate and indicating information concerning the frequency channel of another AP using a connection ID that matches the received connection ID is transmitted to the wireless LAN terminals 110 to 112 (step S208). After such NG information is transmitted, the APs 104, 105 sever the connection to the wireless LAN terminal to which there is presently a connection. Control then returns to step S201.

On the other hand, if the received connection ID and connection ID generated by the AP itself match ("YES" at step S206), the conceivable reason is that the wireless LAN terminal 110, for example, is wirelessly connected to the AP 104 in conference room 101 and a connection ID identical with that generated by the AP 104 has been entered. In this case where the received connection ID and the connection ID generated by the AP itself match, the APs 104, 105 transmit a notification (OK information), which indicates that the connection ID is appropriate and, hence, that the connection IDs match (step S207).

The APs 104, 105 create information relating to the corresponding wireless LAN terminals 110 to 112 and transmit this information to the personal computer 301 via the infrastructure network 113 (step S209). The information created contains MAC (Media Access Control) address information, which has been assigned to wireless LAN cards (Network Interface Cards, or "NICs") used by the wireless LAN terminals, and user information concerning the wireless LAN terminals, etc. The APs 104, 105 transition to a state in which they wait for information from the personal computer 301 as to whether connection is possible or not (step S210).

Next, upon receiving the information from the personal computer 301 as to whether connection is possible or not, the APs 104, 105 transmit this received information to the corresponding wireless LAN terminals 110 to 112 (step S211). Accordingly, if a wireless LAN terminal other than a wireless LAN terminal for which connection is allowed is presently connected to the APs 104, 105, then the APs 104, 105 issue a disconnect request to this wireless LAN terminal so that the connection to this wireless LAN terminal is severed (step S212). This disconnect is performed by a method using filtering based upon the above-mentioned MAC address. Further, in case of a wireless LAN terminal whose connection is allowed, the connection is continued. The APs 104, 105 then return to step S201.

Figure 7:
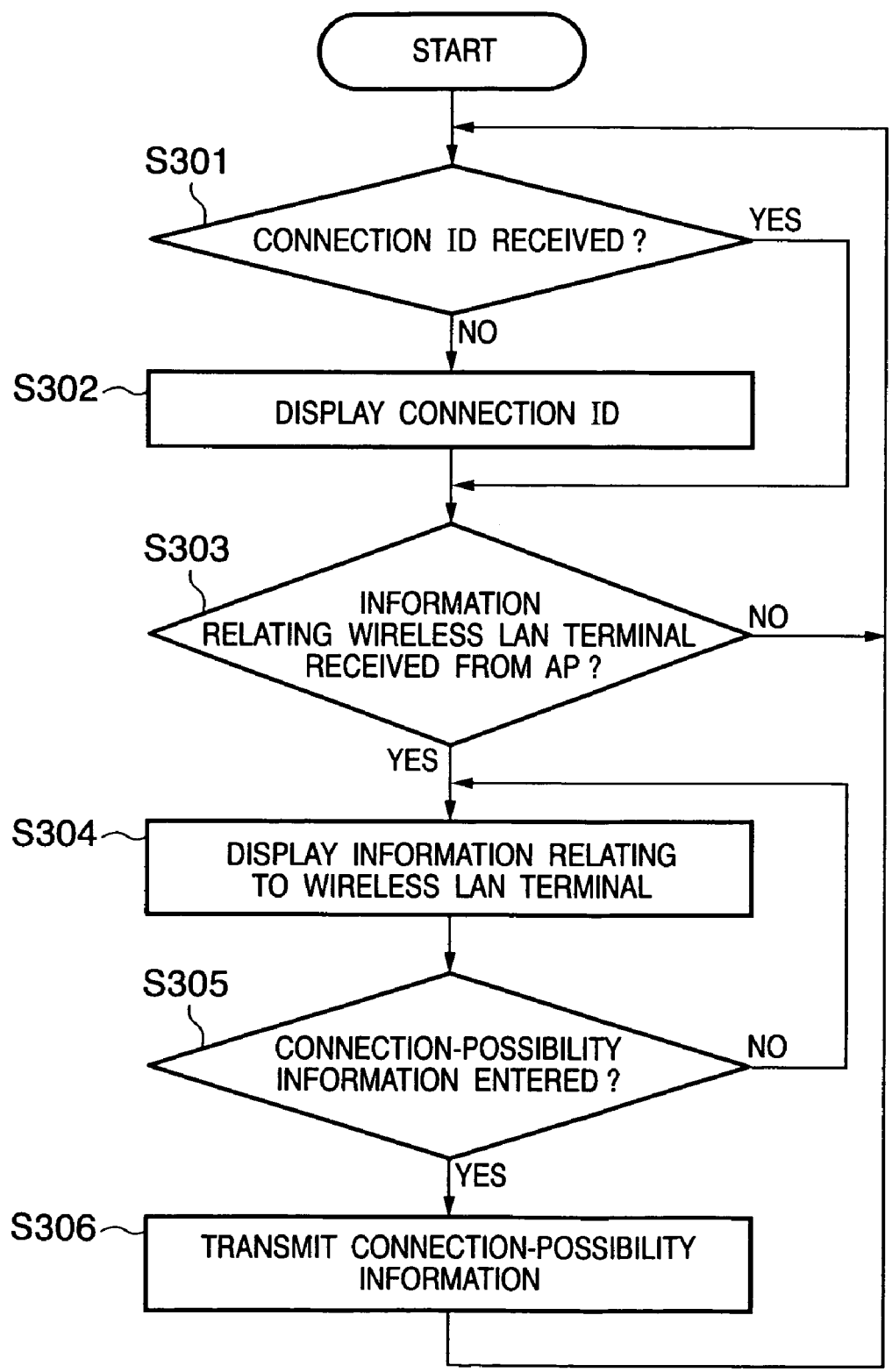
FIG. 7 is a flowchart illustrating the procedure of operation performed by personal computer 301 when wireless LAN terminals 110 to 112 are connected to a specific AP of APs 104 and 105 in an embodiment of the present invention.

Next, reference will be had to FIG. 7 to describe the operation of the personal computer 301 when the wireless LAN terminals 110 to 112 are connected to a specific AP of the APs 104, 105. FIG. 7 is a flowchart illustrating the procedure of the operation performed by the personal computer 301 when the wireless LAN terminals 110 to 112 are connected to a specific AP of APs 104 and 105.

When the power supply of the personal computer 301 is turned on, the personal computer 301 starts up the display device 302 in response. The personal computer 301 after start-up determines whether connection IDs have been received from the APs 104, 105 (step S301), as shown in FIG. 7. If a connection ID has been received, the personal computer 301 displays the received connection ID on the display device 302 (step S302). The display of the connection ID by the display device 302 means that a connection ID necessary for the connection to the corresponding AP (AP 104 in this example) is presented to the users of the wireless LAN terminals 110 to 112 in the vicinity. As a result, the users of the wireless LAN terminals 110 to 112 can ascertain the connection ID necessary for the connection to the desired AP. The method of notifying the users of the wireless LAN terminals 110 to 112 of the connection ID is not limited to the method of displaying the connection ID on the display device 302. For example, methods that can be used include a method of reporting the connection ID to the users of the wireless LAN terminals 110 to 112 in advance by means such as e-mail, and a method of notifying the users of the wireless LAN terminals 110 to 112 by voice.

Next, the personal computer 301 determines whether information relating to a wireless LAN terminal transmitted from the APs 104, 105 at step S209 in FIG. 6 has been received (step S303). If the personal computer 301 has not received information relating to a wireless LAN terminal transmitted from the APs 104, 105, control returns to step S301. On the other hand, if the personal computer 301 has received information relating to a wireless LAN terminal transmitted from the APs 104, 105, then the personal computer 301 displays the received information relating to the wireless LAN terminal on the display device 302 (step S304). Accordingly, based upon the information relating to the wireless LAN terminal displayed on the display device 302, the administrator of the personal computer 301 verifies whether the user of the relevant wireless LAN terminal has been allowed to be connected to the AP. The personal computer 301 waits for input of the result of verification by the administrator (step S305). If the result of verification by the administrator is input, then the personal computer 301 transmits the entered result of verification to the corresponding AP via the infrastructure network 113 as information indicating whether connection is possible or not (step S306). The personal computer 301 then returns to step S301.

Next, the operation of the wireless LAN terminals 110 to 112, APs 104, 105, 107 and personal computer 301 will be described for the following case: the users of the wireless LAN terminals 110 to 112 participate in a conference held in conference room 101, and at such time the wireless LAN terminals 110 to 112 are wirelessly connected to the AP 104 deployed in conference room 101 (see FIG. 3).

Figure 8:
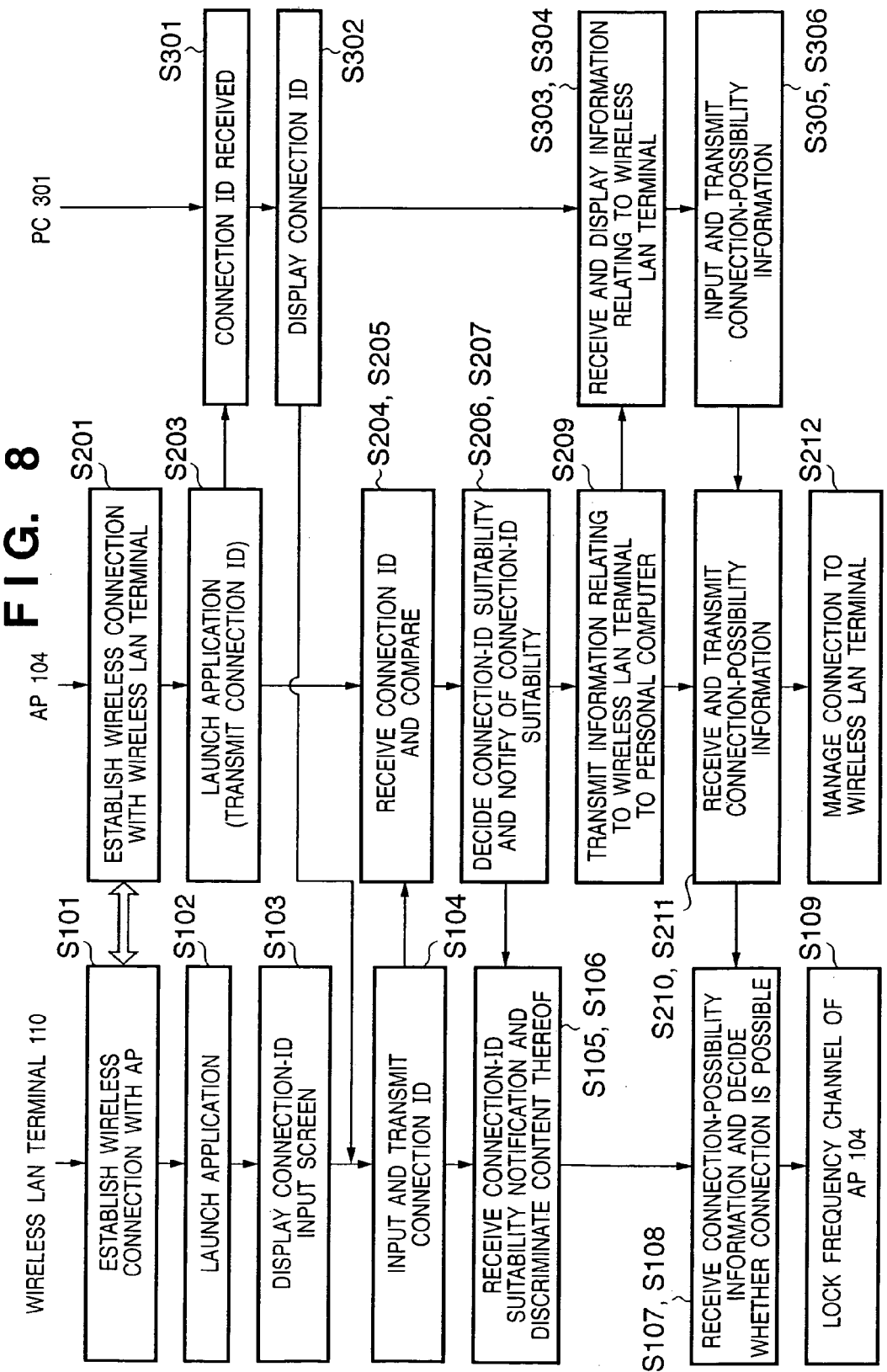
FIG. 8 is a diagram illustrating an operating sequence up to connection of wireless LAN terminal 110 to AP 104 in conference room 101 in an embodiment of the present invention.

First, reference will be had to FIG. 8 to describe operation up to connection of the wireless LAN terminal 110 to the AP 104 in conference room 101. FIG. 8 is a diagram illustrating the operating sequence up to connection of the wireless LAN terminal 110 of FIG. 3 to AP 104 in conference room 101.

After being started up, the wireless LAN terminal 110 uses the previously set ESS-ID and attempts to establish a wireless communication network with the AP (step S101), as shown in FIG. 8. Here it will be assumed that the wireless LAN terminal 110 is connected to the AP 104 deployed in conference room 101. The wireless LAN terminal 110 issues a connection request to the AP 104 after setting frequency channel "1ch", which is identical with the frequency channel that has been set in the AP 104. In response to the connection request from the wireless LAN-terminal 110, the AP 104 establishes a wireless communication network between itself and the wireless LAN terminal 110 (step S201). After the wireless communication network is established, an IP network based upon TCP/IP is established between the wireless LAN terminal 110 and AP 104.

After the IP network is established with the AP 104, the wireless LAN terminal 110 launches the wireless-connection application software for making the connection to the AP 104 (step S102). The connection-ID input screen is displayed on the display device of the wireless LAN terminal 110 by the application software (step S103).

Meanwhile, at the AP 104, the wireless-connection application software is launched after the IP network is established with the wireless LAN terminal 110 (step S203). A connection ID for use in wireless connection is generated randomly by the application software. If a connection ID is already being used by another AP (here the AP 105 in the other conference room 102) connected to the infrastructure network 113, then the AP 104 accepts the connection ID used by the AP 105 via the infrastructure network 113. If the connection ID generated by the AP 104 itself is the same as the connection ID being used by the AP 105, then the AP 104 generates a different connection ID anew so as not to duplicate the connection ID being used by the AP 105. The connection ID generated is transmitted to the personal computer 301 via the infrastructure network 113.

The personal computer 301 receives the connection ID from the AP 104 (step S301) and displays the connection ID on the display device 302 (step S302). In FIG. 8, an arrow is drawn from step S302 ("DISPLAY CONNECTION ID") to wireless LAN terminal 110. However, this does not indicate actual transmission of the connection ID to the user but means that the connection ID necessary for the connection to the AP 104 displayed on the display device 302 is presented to the user of the wireless LAN terminal 110. As a result, the user of the wireless LAN terminal 110 can be informed of the connection ID necessary for the connection to the AP 104.

The user of the wireless LAN terminal 110 who has observed the connection ID displayed on the display device 302 operates the input unit of the wireless LAN terminal 110 and enters the corresponding connection ID. The wireless LAN terminal 110 transmits the entered connection ID to the AP 104 by wireless communication (step S104). The wireless LAN terminal 110 then transitions to a state in which it waits for receipt of notification from the AP 104 as to whether the connection ID is appropriate or not.

Upon receiving the connection ID transmitted from the wireless LAN terminal 110 (step S204), the AP 104 compares the received connection ID and connection IDs being held in the memory within the AP 104 (the connection ID generated by the AP itself and the connection ID acquired from the AP 105) (step S205). Based upon the result of the comparison at step S205, the AP 104 determines whether the received connection ID matches the connection ID generated by the AP 104 itself and transmits the result of the determination to the wireless LAN terminal 110 as the notification of whether the connection ID is appropriate or not (steps S206, S207). Accordingly, it is construed that the connection ID received from the wireless LAN terminal 110 and the connection ID generated by the AP 104 itself match, and the notification of whether the connection ID is appropriate, which notification indicates the fact that the IDs match, is transmitted to the wireless LAN terminal 110.

When the wireless LAN terminal 110, which is waiting for receipt of the notification of whether the connection ID is appropriate from the AP 104, receives this notification from the AP 104, the terminal 110 discriminates the content of the notification received (steps S105, S106). Since the notification received indicates that the connection IDs match, the wireless LAN terminal 110 judges that the entered connection ID is appropriate and transitions to a state in which it waits for receipt of information from the AP 104 as to whether connection is possible or not (step S107).

After it sends the wireless LAN terminal 110 the notification of whether the connection ID is appropriate or not, the AP 104 creates information relating to the wireless LAN terminal 110 and transmits this information to the personal computer 301 (step S209). The information created contains MAC (Media Access Control) address information, which has been assigned to wireless LAN card (Network Interface Card, or "NIC") used by the wireless LAN terminals 110, and user information concerning the wireless LAN terminal 110, etc. The AP 104 then transitions to a state in which it waits for information from the personal computer 301 as to whether connection is possible or not (step S210).

The personal computer 301 receives the information relating to the wireless LAN terminal 110 from the AP 104 and displays it on the display device 302 (steps S303, S304). Based upon the information relating to the wireless LAN terminal 110 displayed on the display device 302, the organizer of the conference managing the personal computer 301 checks to determine whether the user of the wireless LAN terminal 110 is an individual who has been allowed to participate in the conference. The result of the determination made by the organizer is input to the personal computer 301, and the personal computer 301 transmits the entered result to the AP 104 via the infrastructure network 113 as information indicating whether connection is possible or not (steps S305, S306). Accordingly, it is construed that the user of the wireless LAN terminal 110 is an individual who has been allowed to participate in the conference, and the information as to whether connection is possible, which information indicates that the user has been allowed to participate, is transmitted to the AP 104.

When the AP 104, which is waiting for receipt from the personal computer 301 of the information as to whether connection is possible, receives this information from the personal computer 301, the AP 104 transmits the received information to the wireless LAN terminal 110 (step S210, S211). Accordingly, if a wireless LAN terminal other than the wireless LAN terminal who connection has been allowed by the organizer of the conference, i.e., a wireless LAN terminal whose connection has not been allowed, is presently connected to the AP 104, then the AP 104 executes connection processing such as issuing a disconnect request to this wireless LAN terminal and disconnecting this wireless LAN terminal (step S212).

When the wireless LAN terminal 110, which is waiting for receipt from the AP 104 of the information as to whether connection is possible, receives this information from the AP 104, the wireless LAN terminal 110, based upon the received information, determines whether connection to the AP 104 has been allowed (steps S107, S108). Since connection to the AP 104 has been allowed, the wireless LAN terminal 110 locks the frequency channel to 1ch, which is the present frequency channel, in such a manner that a changeover will not be made to an AP other than AP 104 owing to roaming (step S109). As a result, the wireless LAN terminal 110 will be connected to the AP 104 as long as it is within the coverage area of AP 104 inside conference room 101.

Figure 9:
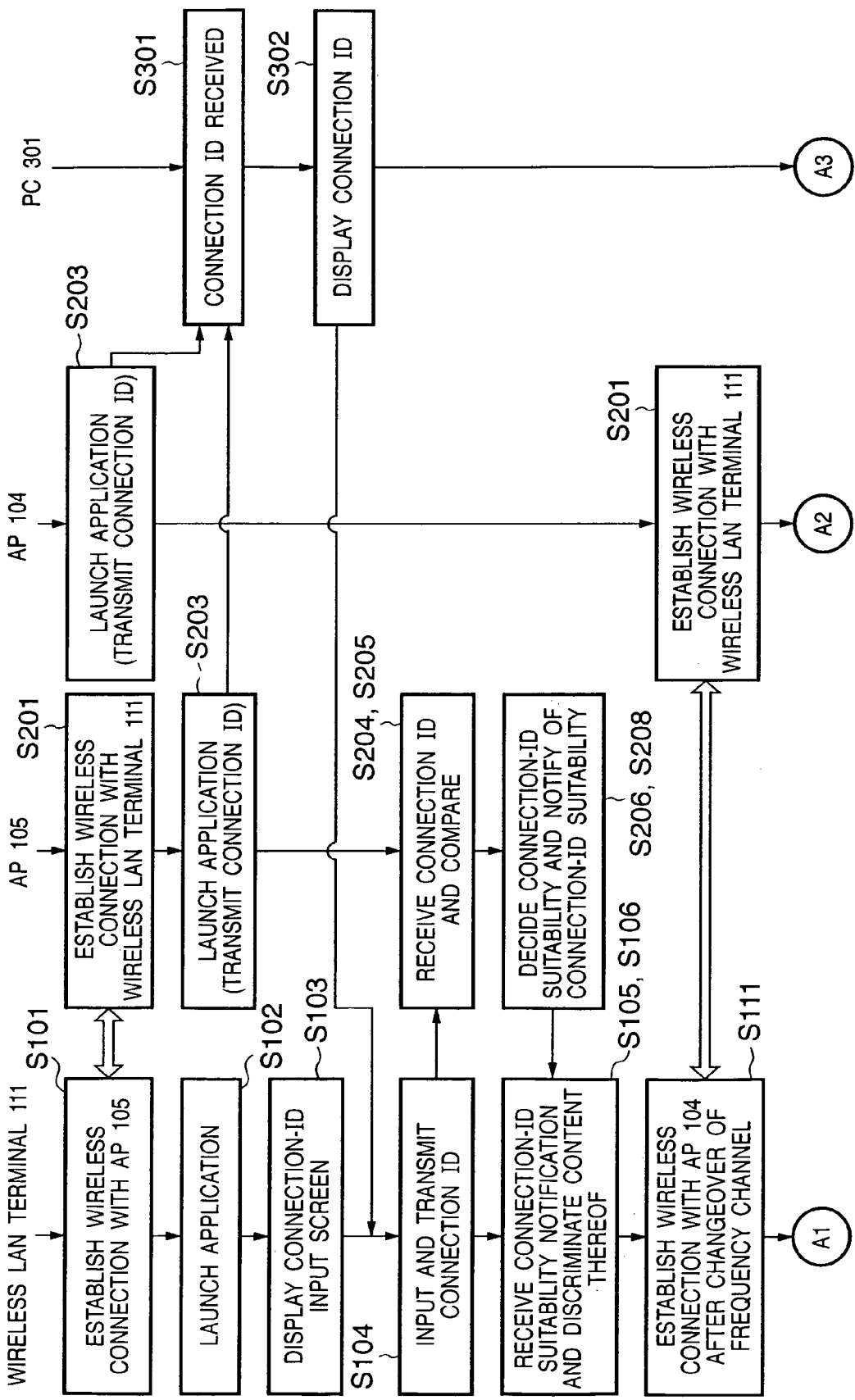
FIG. 9 is a diagram illustrating an operating sequence up to connection of wireless LAN terminal 111 to AP 104 in conference room 101 in an embodiment of the present invention.
Figure 10:
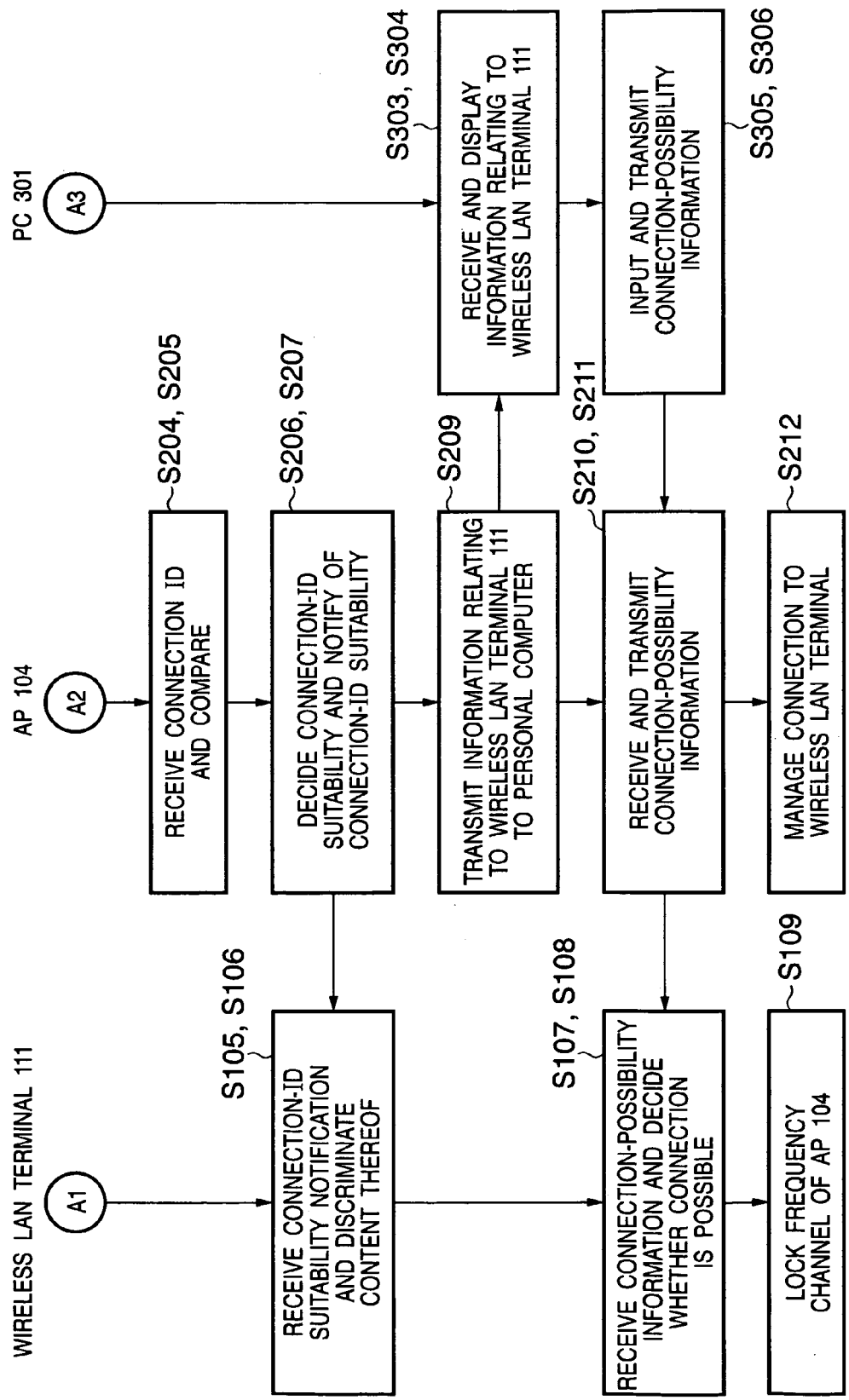
FIG. 10 is a diagram illustrating an operating sequence up to connection of wireless LAN terminal 111 to AP 104 in conference room 101 in an embodiment of the present invention.

Next, reference will be had to FIGS. 9 and 10 to describe operation up to connection of the wireless LAN terminal 111 to the AP 104 in conference room 101. FIGS. 9 and 10 are diagrams illustrating an operating sequence up to connection of the wireless LAN terminal 111 to the AP 104 in conference room 101. Described below is a case where, when the wireless LAN terminal 111 has entered the conference room 101, the terminal is connected to the AP 105, which is situated in the neighboring conference room 101, and not to the AP 104, and is subsequently connected to the AP 104.

In order to establish a wireless communication network with the AP 105 using the ESS-ID set in advance, the wireless LAN terminal 111 issues a connection request to the AP 105 (step S101), as shown in FIG. 9. The reason for this is that the wireless LAN terminal 111 has been set to the frequency channel 6ch of AP 105 (see FIG. 2).

The AP 105 responds to the connection request from the wireless LAN terminal 111 by establishing a wireless communication network between itself and the wireless LAN terminal 111 (step S201). An IP network based upon TCP/IP is established between the wireless LAN terminal 111 and AP 105.

When the IP network based upon TCP/IP is established between the wireless LAN terminal 111 and AP 105, the wireless-connection application software for making the connection to the AP 104 in conference room 101 is launched in wireless LAN terminal 111 (step S102), and the connection-ID input screen is displayed on the display device of wireless LAN terminal 111 by the application software (step S103).

When the IP network connection is established between the AP 105 and the wireless LAN terminal 111 (step S201), the AP 105 launches wireless-connection application software (step S203). A connection ID for use in wireless connection is generated randomly by the application software, and the connection ID generated is transmitted to the personal computer 301 via the infrastructure network 113.

Meanwhile, at the AP 104 after start-up, the wireless-connection application software is launched and a connection ID for use in wireless connection is generated randomly (step S203). The connection ID generated by the AP 104 is transmitted to the personal computer 301 via the infrastructure network 113.

The personal computer 301 receives connection IDs transmitted from the APs 104, 105 (step S301) and displays the received connection IDs on the display device 302 (step S302). In FIG. 9, an arrow is drawn from step S302 to wireless LAN terminal 111. However, this does not indicate actual transmission of data from the personal computer 301 to the wireless LAN terminal 111 but means that the connection ID being displayed on the display device 302 is presented to the user of the wireless LAN terminal 111.

The user of the wireless LAN terminal 111 who has verified the connection ID displayed on the display device 302 operates the input unit and inputs the corresponding connection ID (here the connection ID corresponding to AP 104) of the connection IDs being displayed on the display device 302, the input being made via the connection-ID input screen displayed on the display device of the wireless LAN terminal 111. The wireless LAN terminal 111 transmits the entered connection ID regarding the AP 104 to the AP 105 (step S104). The wireless LAN terminal 111 then transitions to a state in which it waits for receipt of notification from the AP 105 as to whether the connection ID is appropriate or not (step S105).

Upon receiving the connection ID from the wireless LAN terminal 111 (step S204), the AP 105 compares the received connection ID and connection IDs being held in the AP 105 [the connection ID generated by the AP itself and a connection ID acquired from another AP (here the connection ID acquired from the AP 104)] (step S205). Based upon the result of the comparison, the AP 105 determines whether the connection ID is appropriate or not and transmits notification of whether the connection ID is appropriate or not, which corresponds to the result of this determination, to the wireless LAN terminal 111 (steps S206, S208). Since the connection ID received from the wireless LAN terminal 111 is the connection ID of the AP 104, the received connection ID is different from the connection ID generated by the AP 105 but it matches the connection ID used by the other AP, namely AP 104. Accordingly, the AP 105 transmits information concerning the frequency channel of AP 104, which uses the connection ID that matches the received connection ID, to the wireless LAN terminal 111 as the notification of whether the connection ID is appropriate or not.

When the wireless LAN terminal 111, which is waiting for receipt of notification from AP 105 as to whether the connection ID is appropriate or not, receives this notification from the AP 105, it discriminates the content of the notification received (steps S105, S106). Information concerning the frequency channel of the AP 104 is reported by the information giving notification of whether the connection ID is appropriate or not. Therefore, in order to make a connection to the AP 104, the wireless LAN terminal 111 changes over the frequency channel to the frequency channel reported and issues a connection request to the AP 104. After a wireless communication network is established with the AP 104, the wireless LAN terminal 111 transmits the connection ID (the connection ID that was entered at step S204) to the AP 104 (step S111). The wireless LAN terminal 111 then transitions to a state in which it waits for receipt of notification from the AP 104 as to whether the connection ID is appropriate or not (step S105).

The AP 104 responds to the connection request from the wireless LAN terminal 111 by establishing a wireless communication network between itself and the wireless LAN terminal 111 (step S201). The AP 104 receives the connection ID transmitted from the wireless LAN terminal 111, as shown in FIG. 10, and compares the received connection ID with connection IDs being held in the AP 104 (the connection ID generated by the AP itself and the connection ID acquired from the AP 105) (steps S204, S205). Based upon the result of the comparison, the AP 104 determines whether the received connection ID matches the connection ID generated by the AP 104 itself and transmits the notification of whether the connection ID is appropriate, which corresponds to the result of the comparison, to the wireless LAN terminal 111 (steps S206, S207). Since the two connection IDs match, the AP 104 transmits the notification of whether the connection ID is appropriate, which notification indicates the fact that the connection IDs match, to the wireless LAN terminal 111.

The wireless LAN terminal 111 receives the notification of whether the connection ID is appropriate from the AP 104 and discriminates the content of the notification received (steps S105, S106). Since the fact that the connection ID entered by the wireless LAN terminal 111 matches the connection ID of the AP 104 is reported by the received notification of whether the connection ID is appropriate or not, the wireless LAN terminal 111 judges that the entered connection ID is appropriate and transitions to a state in which it waits for receipt of information from the AP 104 as to whether connection is possible or not (step S107).

After it sends the wireless LAN terminal 111 the notification of whether the connection ID is appropriate or not, the AP 104 creates information relating to the wireless LAN terminal 111 and transmits this information to the personal computer 301 (step S209).

The personal computer 301 receives the information relating to the wireless LAN terminal 111 from the AP 104 and displays it on the display device 302 (steps S303, S304). Based upon the information relating to the wireless LAN terminal 111 displayed on the display device 302, the organizer of the conference managing the personal computer 301 checks to determine whether the user of the wireless LAN terminal 111 is an individual who has been allowed to participate in the conference. The result of the determination made by the organizer is input to the personal computer 301, and the personal computer 301 transmits the entered result of the determination to the AP 104 via the infrastructure network 113 as information indicating whether connection is possible or not (steps S305, S306). Accordingly, the user of the wireless LAN terminal 111 is verified by the organizer of the conference as being an individual whose participation in the conference is allowed and information as to whether connection is possible, which information indicates the result of the verification, is transmitted to the AP 104.

Upon receiving from the personal computer 301 the information as to whether connection is possible, the AP 104 transmits the received information to the wireless LAN terminal 111 (step S210, S211). Accordingly, if a wireless LAN terminal whose connection has not been allowed is presently connected to the AP 104, then the AP 104 issues a disconnect request to this wireless LAN terminal and disconnects this wireless LAN terminal (step S212).

Upon receiving from the AP 104 the information as to whether connection is possible or not, the wireless LAN terminal 111, based upon the received information, determines whether connection to the AP 104 has been allowed (steps S107, S108). Since connection to the AP 104 has been allowed, the wireless LAN terminal 111 locks the frequency channel to 1ch, which is the present frequency channel, in such a manner that a changeover will not be made to an AP other than AP 104 owing to roaming (step S109). As a result, the wireless LAN terminal 111 will be connected to the AP 104 as long as it is within the coverage area of AP 104 inside conference room 101.

Figure 11:
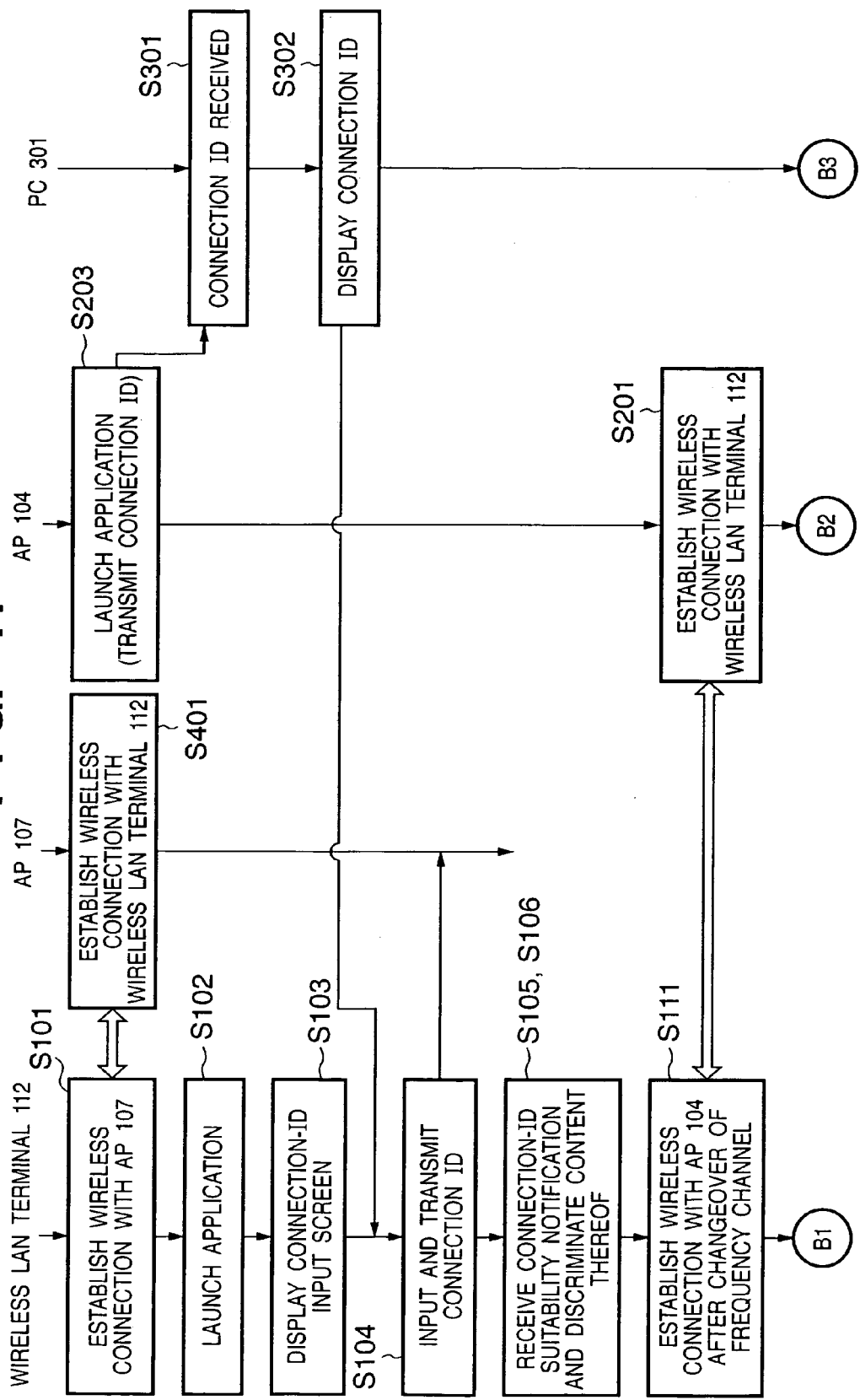
FIG. 11 is a diagram illustrating an operating sequence up to connection of wireless LAN terminal 112 to AP 104 in conference room 101 in an embodiment of the present invention.
Figure 12:
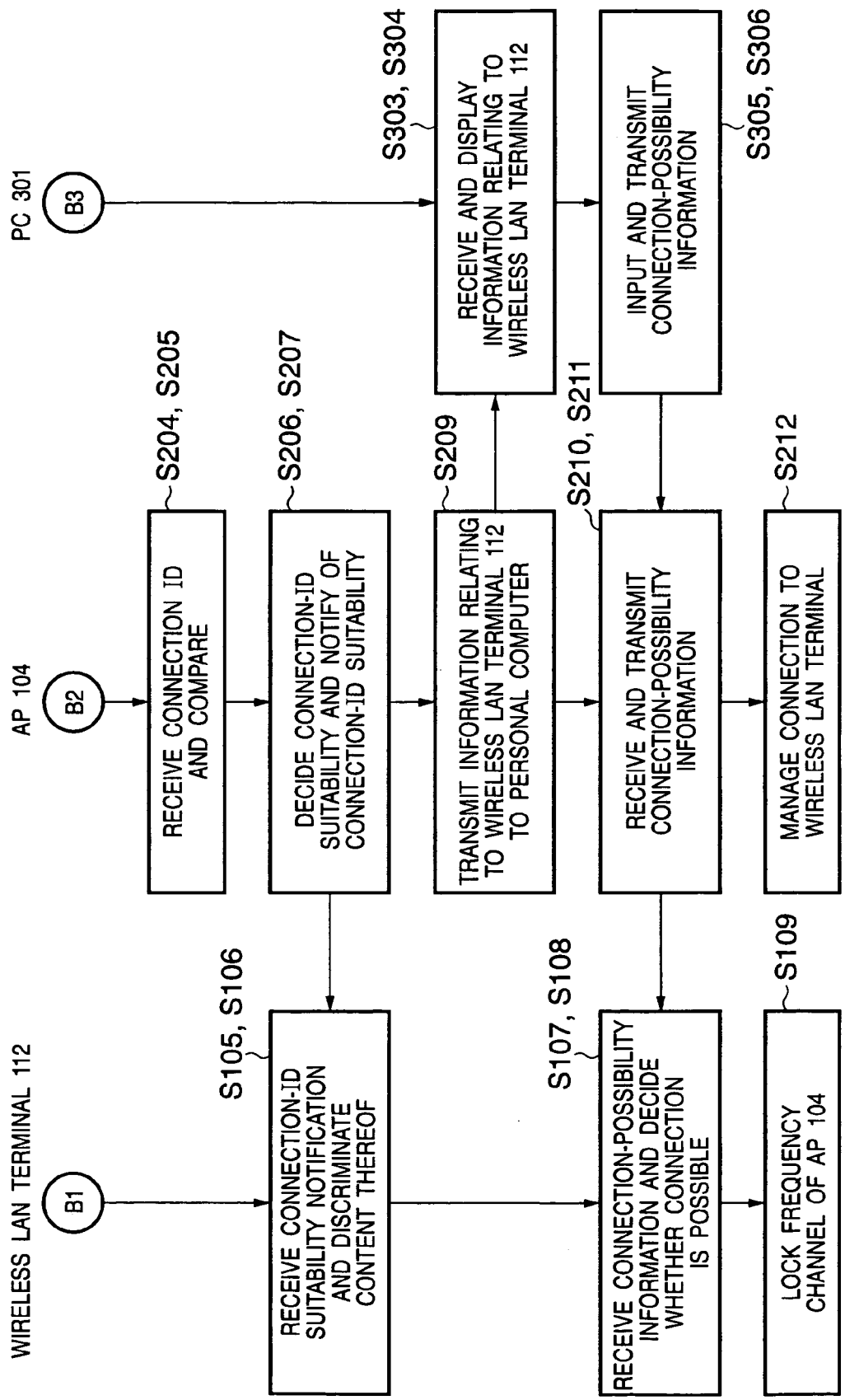
FIG. 12 is a diagram illustrating an operating sequence up to connection of wireless LAN terminal 112 to AP 104 in conference room 101 in an embodiment of the present invention.

Next, reference will be had to FIGS. 11 and 12 to describe operation up to connection of the wireless LAN terminal 112 to the AP 104 in conference room 101. FIGS. 11 and 12 are diagrams illustrating an operating sequence up to connection of the wireless LAN terminal 112 to the AP 104 in conference room 101. Described below is a case where, when the wireless LAN terminal 112 has entered the conference room 101, the terminal is connected to the AP 107, which is situated in the private room 103, and not to the AP 104, and is subsequently connected to the AP 104.

In order to establish a wireless communication network with the AP 107 using the ESS-ID set in advance, the wireless LAN terminal 112 issues a connection request to the AP 107 (step S101), as shown in FIG. 11. The reason for this is that the wireless LAN terminal 112 has been set to the frequency channel 11ch of AP 107 (see FIG. 2).

The AP 107 responds to the connection request from the wireless LAN terminal 112 by establishing a wireless communication network between itself and the wireless LAN terminal 112 (step S401). An IP network based upon TCP/IP is established between the wireless LAN terminal 111 and AP 107. Here the wireless-connection application software has not been installed in the AP 107.

When the IP network based upon TCP/IP is established between the wireless LAN terminal 112 and AP 107, the wireless-connection application software for making the connection to the AP 104 in conference room 101 is launched in wireless LAN terminal 112 (step S102). The connection-ID input screen is displayed on the display device of wireless LAN terminal 112 by the application software (step S103).

Meanwhile, at the AP 104 after start-up, the wireless-connection application software is launched and a connection ID for use in wireless connection is generated randomly (step S203). The connection ID generated by the AP 104 is transmitted to the personal computer 301 via the infrastructure network 113.

The personal computer 301 receives the connection ID transmitted from the AP 104 (step S301) and displays the received connection ID on the display device 302 (step S302). In FIG. 11, an arrow is drawn from step S302 to wireless LAN terminal 112. However, the arrow does not mean that data is transmitted from the personal computer 301 to the wireless LAN terminal 112 but means that the connection ID being displayed on the display device 302 is presented to the user of the wireless LAN terminal 112.

The user of the wireless LAN terminal 112 who has verified the connection ID displayed on the display device 302 operates the input unit and inputs the connection ID corresponding to the desired AP (here the connection ID corresponding to AP 104) of the connection IDs being displayed on the display device 302, the input being made via the connection-ID input screen displayed on the wireless LAN terminal 112. The wireless LAN terminal 112 transmits the entered connection ID regarding the AP 104 to the AP 107 (step S104). The wireless LAN terminal 112 then transitions to a state in which it waits for receipt of notification from the AP 107 as to whether the connection ID is appropriate or not (step S105).

The wireless-connection application software, however, has not been installed in the AP 107, and therefore the AP 107 does not transmit notification of whether the connection ID is appropriate or not regarding the connection ID transmitted from the wireless LAN terminal 112. Accordingly, the wireless LAN terminal 112 does not receive notification from the AP 107 as to whether the connection ID is appropriate or not, severs the connection to the AP 107 automatically upon elapse of a prescribed period of time, changes over the frequency channel from 11ch to other frequency channels successively and attempts to establish a connection with an AP that has a roaming capability (step S111). Since another AP that is capable of roaming is the AP 104, the wireless LAN terminal 112 changes over the frequency channel to 1ch, issues a connection request to the AP 104 and establishes a wireless communication network with the AP 104. Further, the wireless LAN terminal 112 transmits the connection ID (the connection ID that was entered at step S104) at this time (step S111). The wireless LAN terminal 112 then transitions to a state in which it waits for receipt of notification from the AP 104 as to whether the connection ID is appropriate or not (step S105), as shown in FIG. 12.

The AP 104 responds to the connection request from the wireless LAN terminal 112 by establishing a wireless communication network between itself and the wireless LAN terminal 112 (step S201). The AP 104 receives the connection ID transmitted from the wireless LAN terminal 112, as shown in FIG. 12, and compares the received connection ID with connection IDs being held in the AP 104 (the connection ID generated by the AP itself and the connection ID acquired from the AP 105) (steps S204, S205). Based upon the result of the comparison, the AP 104 determines whether the received connection ID matches the connection ID generated by the AP 104 itself and transmits the notification of whether the connection ID is appropriate, which corresponds to the result of the comparison, to the wireless LAN terminal 112 (steps S206, S207). Since the two connection IDs match, the AP 104 transmits the notification of whether the connection ID is appropriate, which notification indicates the fact that the connection IDs match, to the wireless LAN terminal 112.

The wireless LAN terminal 112 receives the notification of whether the connection ID is appropriate from the AP 104 and discriminates the content of the notification received (steps S105, S106). Since the fact that the connection ID entered by the wireless LAN terminal 112 matches the connection ID of the AP 104 is reported by the received notification of whether the connection ID is appropriate or not, the wireless LAN terminal 112 judges that the entered connection ID is appropriate and transitions to a state in which it waits for receipt of information from the AP 104 as to whether connection is possible or not (step S107).

After it sends the wireless LAN terminal 112 the notification of whether the connection ID is appropriate or not, the AP 104 creates information relating to the wireless LAN terminal 111 and transmits this information to the personal computer 301 (step S209).

The personal computer 301 receives the information relating to the wireless LAN terminal 112 from the AP 104 and displays it on the display device 302 (steps S303, S304). Based upon the information relating to the wireless LAN terminal 112 displayed on the display device 302, the organizer of the conference managing the personal computer 301 checks to determine whether the user of the wireless LAN terminal 112 is an individual who has been allowed to participate in the conference. The result of the determination made by the organizer is input to the personal computer 301, and the personal computer 301 transmits the entered result of the determination to the AP 104 via the infrastructure network 113 as information indicating whether connection is possible or not (steps S305, S306). Accordingly, the user of the wireless LAN terminal 112 is verified by the organizer of the conference as being an individual whose participation in the conference is allowed and information as to whether connection is possible, which information indicates the result of the verification, is transmitted to the AP 104.

Upon receiving from the personal computer 301 the information as to whether connection is possible, the AP 104 transmits the received information to the wireless LAN terminal 112 (step S210, S211). Accordingly, if a wireless LAN terminal other than a wireless LAN terminal whose connection has been allowed by the organizer of the conference is presently connected to the AP 104, then the AP 104 issues a disconnect request to this wireless LAN terminal other than one whose connection has been allowed and severs the connection to this wireless LAN terminal (step S212).

Upon receiving from the AP 104 the information as to whether connection is possible or not, the wireless LAN terminal 112, based upon the received information, determines whether connection to the AP 104 has been allowed (steps S107, S108). Since connection to the AP 104 has been allowed, the wireless LAN terminal 112 locks the frequency channel to 1ch, which is the present frequency channel, in such a manner that a changeover will not be made to an AP other than AP 104 owing to roaming (step S109). As a result, the wireless LAN terminal 112 will be connected to the AP 104 as long as it is within the coverage area of AP 104 inside conference room 101.

Thus, even if a wireless LAN terminal is connected to an AP other than the desired AP 104 and this AP does not correspond to the setting/response of the connection ID, the wireless LAN terminal can be connected to the desired AP.

Thus, in accordance with this embodiment, the same connection ID is set between a wireless LAN terminal and an AP in a roaming environment in which the same ESS-ID has been set in all APs, thereby making it possible to wirelessly connect the wireless LAN terminal to a specific AP. Further, in order to sever a connection to a specific AP, it will suffice to release the lock on the frequency channel that corresponds to the specific AP whose frequency channel is currently locked. As a result, the wireless LAN terminal is capable of roaming to another AP without changing the ESS-ID. As a result, the original environment can be returned to at the moment the connection to the specific AP becomes unnecessary.

In this example, operation up to the connection of the wireless LAN terminals 110 to 112 to the AP 104 in the conference room 101 by the wireless-connection application software has been illustrated as indicated in FIGS. 8 to 12. When processing according to the application software is exited, however, the frequency channel that has been locked at 1ch is released from the lock temporarily in each of the wireless LAN terminals 110 to 112. The wireless LAN terminals 110 to 112 thenceforth are re-connected to the corresponding APs in accordance with the positions thereof.

It goes without saying that the object of the invention is attained also by supplying a storage medium (recording medium) storing the program codes of the software for performing the functions of the foregoing embodiment to a system or an apparatus, reading the program codes with a computer (e.g., a CPU or MPU) of the system or apparatus from the storage medium, and then executing the program codes. In this case, the program codes per se read from the storage medium implement the novel functions of the embodiment and the recording medium storing the program codes constitutes the invention.

Examples of storage media that can be used for supplying the program code are a floppy (registered trademark) disk, hard disk, magneto-optical disk, CD-ROM, CD-R, CD-RW, DVD-ROM, DVD-RAM, DVD-RW, DVD+RW, magnetic tape, non-volatile type memory card or ROM, etc. Alternatively, the program codes may be downloaded via a network.

Furthermore, besides the case where the aforesaid functions according to the embodiment are implemented by executing the program codes read by a computer, the present invention covers a case where an operating system or the like running on the computer performs a part of or the entire process based upon the designation of program codes and implements the functions of the embodiment by this processing.

It goes without saying that the present invention further covers a case where, after the program codes read from the storage medium are written in a function expansion card inserted into the computer or in a memory provided in a function expansion unit connected to the computer, a CPU or the like contained in the function expansion board or function expansion unit performs a part of or the entire process in accordance with the designation of program codes and implements the function of the above embodiment.

In accordance with the present invention, as described above, a wireless communication device can be wirelessly connected uniquely to a specific single wireless communication access point among a plurality of these wireless communication access points in a roaming environment.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-162456 filed on May 31, 2004, the entire contents of which are hereby incorporated by reference herein.

What is claimed is:

1. A communication system having a communication apparatus and a plurality of connecting apparatuses, said plurality of connecting apparatuses being assigned the same network ID, wherein said communication apparatus comprises:

an input device for manually inputting identification information for identifying a specific connecting apparatus among said plurality of connecting apparatuses, the manually input identification information being unique and different from the network ID;

a transmitting device for transmitting the manually input identification information, which has been input by said input device, to a first connecting apparatus among said plurality of connecting apparatuses; and a setting device for performing a setting for making a connection to said specific connecting apparatus based upon a response which has been transmitted from said first connecting apparatus, wherein said transmitting device is further configured to discover said specific connecting apparatus by transmitting the same manually input identification information which has been transmitted to said first connecting apparatus to a second connecting apparatus which is one of said plurality of connecting apparatuses, when the response indicates that said first connecting apparatus is not said specific connecting apparatus.

2. The system according to claim 1, which system is a wireless LAN communication system.

3. A communication apparatus comprising:

an input device for manually inputting identification information for identifying a specific connecting apparatus among a plurality of connecting apparatuses, said plurality of connecting apparatuses being assigned the same network ID which is different from the manually input identification information, and the manually input identification information being unique;

a transmitting device for transmitting the manually input identification information, which has been input by said input device, to a first connecting apparatus among said plurality of connecting apparatuses; and a setting device for performing a setting for making a connection to said specific connecting apparatus based upon a response, which has been transmitted from said first connecting apparatus, wherein said transmitting device is further configured to discover said specific connecting apparatus by transmitting the same manually input identification information which has been transmitted to said first connecting apparatus, to a second connecting apparatus which is one of said plurality of connecting apparatuses, when the response that indicates said first connecting apparatus is not said specific connecting apparatus.

4. The apparatus according to claim 3, wherein when connection information for making a connection to said specific connecting apparatus is reported to said setting device as the response from said connected connecting apparatus, said setting device performs a setting for connecting said specific connecting apparatus based upon the connection information reported.

5. The apparatus according to claim 4, wherein the connection information is information indicating a frequency that said specific connecting apparatus uses in order to perform wireless communication.

6. The apparatus according to claim 3, further comprising:

a first discriminating device for discriminating, based upon the response from said first connecting apparatus, a match between the identification information transmitted by said transmitting device and identification information of said first connecting apparatus; and a second discriminating device for discriminating that connection to said first connecting apparatus has been allowed.

7. The apparatus according to claim 3, further comprising a connecting device that is connected to another connecting apparatus if there is no response from said connected connecting apparatus.

8. The apparatus according to claim 3, which system is a wireless LAN terminal.

9. A connecting apparatus for being connected to a communication apparatus, said connecting apparatus being one of a plurality of connecting apparatuses assigned the same network ID, said connecting apparatus comprising:

a storage device for storing first identification information for identifying said connecting apparatus among said plurality of connecting apparatuses;

a receiving device for receiving second identification information, which is for identifying a specific connecting apparatus among said plurality of connecting apparatuses, transmitted from said communication apparatus;

a notification device for notifying information of said communication apparatus to an external information processing apparatus coupled to said connecting apparatus when the first identification information is identical to the second identification information; and a transmitting device for transmitting allowance/rejection information to said communication apparatus, the allowance/rejection information indicating whether or not a user of said external information processing apparatus allows said communication apparatus to connect to said connecting apparatus.

10. The apparatus according to claim 9, further comprising an obtaining device for obtaining third identification information for identifying another connecting apparatus over a network.

11. The apparatus according to claim 10, wherein said storage device also stores the third identification information, and wherein said notification device notifies connection information, which is for connecting said communication apparatus to said specific connecting apparatus, to said communication apparatus in accordance with the second identification information and the third identification information.

12. The apparatus according to claim 9, further comprising:

a generating device for generating the first identification information; and a transmitting device for transmitting the first identification information to another connecting apparatus.

13. The apparatus according to claim 9, wherein said notification device reports information, which indicates a frequency for making a connection to said specific connecting apparatus, as the connection information.

14. The apparatus according to claim 9, which apparatus is a wireless LAN access point.

15. A method of communication by a communication apparatus, comprising:

a transmitting step of transmitting manually input identification information, which has been entered by a user for identifying a specific connecting apparatus, to a first connecting apparatus among a plurality of connecting apparatuses assigned the same network ID, wherein the manually input identification information is unique and different from the network ID; and a setting step of performing a setting for making a connection to said specific connecting apparatus based upon a response from said first connecting apparatus, wherein said method discovers said specific connecting apparatus by transmitting the same manually input identification information which has been transmitted to said first connecting apparatus to a second connecting apparatus which is one of said plurality of connecting apparatuses, when the response indicates that said first connecting apparatus is not said specific connecting apparatus.

16. A method of communication by a connecting apparatus for being connected to a communication apparatus, the connecting apparatus being one of a plurality of connecting apparatuses assigned the same network ID, said method comprising:

a comparing step of comparing (a) previously stored first identification information for identifying said connecting apparatus among said plurality of connecting apparatuses and (b) second identification information, which has been transmitted from said communication apparatus, for identifying a specific connecting apparatus among said plurality of connecting apparatuses;

a notifying step for notifying information of said communication apparatus to an external information processing apparatus coupled to said connecting apparatus when the first identification information is identical to the second identification information; and a transmitting step for transmitting allowance/rejection information to said communication apparatus, the allowance/rejection information indicating whether or not a user of said external information processing apparatus allows said communication apparatus to connect to said connecting apparatus.

17. A computer program product for controlling a communication apparatus, comprising:

a transmitting step of transmitting manually input identification information, which has been entered by a user for identifying a specific connecting apparatus, to a first connecting apparatus among a plurality of connecting apparatuses assigned the same network ID, wherein the manually input identification information is unique and different from the network ID; and a setting step of performing a setting for making a connection to said specific connecting apparatus based upon a response from said first connecting apparatus, wherein said method discovers said specific connecting apparatus by transmitting the same manually input identification information which has been transmitted to said first connecting apparatus to a second connecting apparatus which is one of said plurality of connecting apparatuses, when the response indicates that said first connecting apparatus is not said specific connecting apparatus.

18. A computer program product for controlling a connecting apparatus for being connected to a communication apparatus, the connecting apparatus being one of a plurality of connecting apparatuses assigned the same network ID, said method comprising:

a comparing step of comparing (a) previously stored first identification information for identifying said connecting apparatus among said plurality of connecting apparatuses and (b) second identification information, which has been transmitted from said communication apparatus, for identifying a specific connecting apparatus among said plurality of connecting apparatuses;

a notifying step for notifying information of said communication apparatus to an external information processing apparatus coupled to said connecting apparatus when the first identification information is identical to the second identification information; and a transmitting step for transmitting allowance/rejection information to said communication apparatus, the allowance/rejection information indicating whether or not a user of said external information processing apparatus allows said communication apparatus to connect to said connecting apparatus.

* * * * *